United States Patent [19]

Busler

[11] 4,074,609
[45] Feb. 21, 1978

[54] ANCHOR BOLT ASSEMBLY
[75] Inventor: Albert Busler, Altmuhldorf, Germany
[73] Assignee: Hilti Aktiengesellschaft, Schaan, Liechtenstein
[21] Appl. No.: 728,160
[22] Filed: Sept. 30, 1976
[30] Foreign Application Priority Data
Oct. 1, 1975 Germany .............................. 2543912
[51] Int. Cl.² ............................................. F16B 13/06
[52] U.S. Cl. ............................................. 85/77; 85/85
[58] Field of Search .................... 85/75, 74, 73, 76, 79, 85/87, 86, 88, 85, 77, 78

[56] References Cited
U.S. PATENT DOCUMENTS

| 3,124,030 | 3/1964 | Strand | 85/77 |
|---|---|---|---|
| 3,352,193 | 11/1967 | Lerich | 85/79 |
| 3,703,119 | 11/1972 | Lerich | 85/87 X |
| 3,750,519 | 8/1973 | Lerich | 85/76 X |
| 3,750,526 | 8/1973 | Lerich | 85/85 X |
| 3,799,027 | 3/1974 | Galloway | 85/79 |

FOREIGN PATENT DOCUMENTS 844,097  7/1952  Germany .............................. 85/75

Primary Examiner—Ramon S. Britts
Attorney, Agent, or Firm—Toren, McGeady and Stanger

[57] ABSTRACT

An anchor bolt assembly for insertion into a borehole includes an elongated anchor bolt and an expanding member which is forced radially outwardly into locking engagement with the borehole surface by pulling the anchor bolt through the expanding member in the direction out of the borehole. A stop is provided on the anchor bolt which contacts the expanding member after the locking engagement has been effected and prevents the anchor bolt from being pulled completely through the expanding member. Such a stopping action avoids the loss of the anchoring ability of the assembly.

11 Claims, 4 Drawing Figures

ANCHOR BOLT ASSEMBLY

SUMMARY OF THE INVENTION

The present invention is directed to an anchor bolt assembly consisting of an anchor bolt and a separate tubular-shaped expanding member, the bolt is threaded at its rearward end and forwardly of the threaded section it has a cylindrical portion of reduced diameter about which the expanding member fits with an expanding section located forwardly of the reduced diameter section which spreads the expanding member outwardly when the bolt is pulled out of a prepared borehole. The expanding member includes a pair of shell sections forming a tubular shaped section and the shell sections are secured to a ring-shaped retaining member.

Anchor bolts of this type have the advantage of being extremely simple in design and thus economical to produce. In addition, their use presents no problems because the anchor bolts, having the expanding member enclosing an essentially cylindrical portion of the anchor bolt shank, can readily be introduced into a prepared borehole of a size corresponding essentially to the outside diameter of the bolt body without any danger of an initial spreading taking place as the anchor bolt assembly is introduced into the borehole.

When the expanding member of these assemblies is forced outwardly into engagement with the borehole surface, the anchor bolt is displaced relative to the expanding member. The expanding action is accomplished by pulling the anchor bolt outwardly from the borehole by a certain amount after it has been introduced into the borehole and, as a result, the shell sections on the expanding member are displaced outwardly into contact with the borehole surfaces by moving a conically shaped expanding section of the anchor bolt through the shell sections. A radially uniformly distributed expansion of the expanding member results and provides the considerable anchoring powers achieved with this type of anchor bolt.

The radial spreading of the expanding member and the anchoring action within the borehole increases as the bolt continues to be pulled through the expanding member. The maximum anchoring action is reached when the expanding shell sections of the expanding member are disposed in surface contact with the largest diameter portion of the frusto-conically shaped expanding section on the anchor bolt. However, the anchoring action is completely lost when the maximum diameter part of the expanding section passes through the tubular shaped expanding member, that is, when the bolt is displaced through the expanding member to the extent that its expanding shell sections are no longer forced outwardly into contact with the borehole surfaces. Without the radially outwardly directed supported provided by the frusto-conically shaped section of the anchor bolt, the expanding member is no longer held in contact with the borehole surfaces and the anchoring action is lost.

It is the primary object of the present invention to provide an anchor bolt assembly of the type described above which prevents the loss of the anchoring action.

In accordance with the present invention, loss of the anchoring action is prevented by providing a stop on that portion of the anchor bolt which moves through the expanding member as the member is spread radially outwardly.

Complete displacement of the anchor bolt through the expanding member is prevented by the interaction of the stop on the anchoring bolt with an appropriate part of the expanding member. This arrangement assures that the anchor bolt assembly never loses its anchoring power. While the stop may be located either on the essentially cylindrically shaped portion of the anchor bolt on which the expanding member is located or on the expanding section of the anchor bolt located forwardly of the cylindrically shaped section, the possibility exists, depending on the shape and configuration of the stop, to provide on a part of the expanding member appropriate means which will cooperate with the stop, such as protrusions, shoulders, collars or the like. As an example, the stop can be provided on the reduced diameter cylindrically shaped section of the bolt in the form of a shoulder for interaction with a corresponding shoulder or collar on the inner contour of the shell sections of the expanding member which are forced radially outwardly or on a retaining member connected to the shell sections.

In one preferred embodiment of the invention, the expanding member has the expanding shell sections located at its forward end and a ring-shaped retaining member spaced rearwardly from the shell sections in the axial direction of the anchor bolt with connecting members extending between the shell sections and the retaining member. This design has particular production engineering advantages, because the expanding member including its retaining member can be produced as a simple stamped part which can be bent or rolled into the desired tubular shape. With the connecting members extending between the expanding shell sections and the retaining member, there is the additional advantage that the radially outward movement of the shell sections is not impaired by the retaining member. This characteristic is particularly important for effecting the radially uniformly distributed spreading action of the expanding shell sections which results in especially effective anchoring action.

In combination with the described expanding member, the stop is preferably located between the position of the retaining ring and the forward end of the anchor bolt when the assembly is positioned in a borehole before the expanding action is effected. In this position between the retaining member and the expanding shell sections of the expanding member, the stop does not impair the freedom of movement of the shell sections and retains its function as the shell sections are spread radially outwardly.

In another embodiment, the stop can be provided in the form of an annular projection. Chordally extending flat side surfaces can be provided on the annular projection for cooperating with the connecting members which extend between the retaining member and the shell sections of the expanding member. These flat side surfaces provide considerable design freedom for the connecting members so that their cross-sectional area transverse to the axial direction of the anchor bolt can be increased without any danger that they will project radially outwardly of the outer contour of the anchor bolt. Moreover, the flat sides protect against rotation assuring that the expanding member consisting of the shell sections, the connecting members and the ring-shaped retaining member can not rotate relative to the anchor bolt, thereby assuring that the shell sections can be expanded radially.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
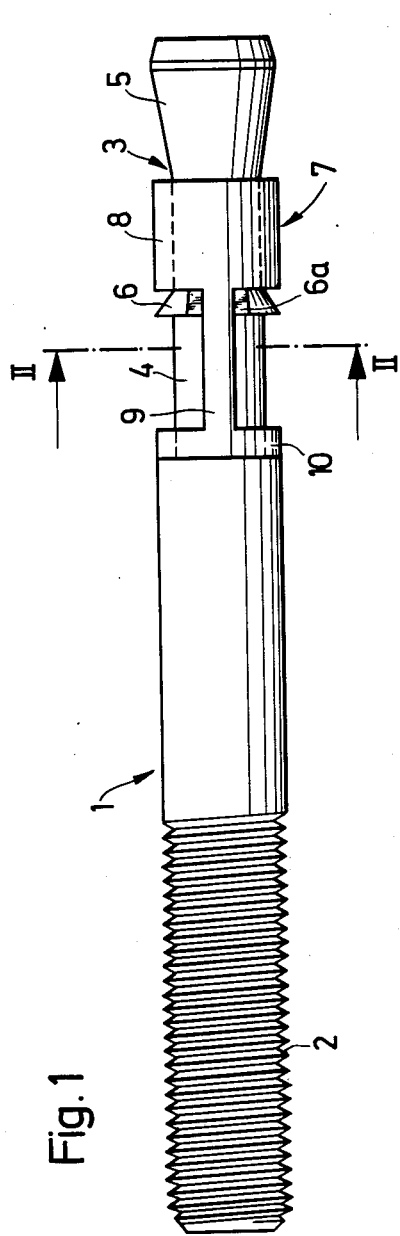
FIG. 1 is a side view of an anchor bolt assembly, embodying the present invention, with the assembly ready to be inserted into a borehole.
Figure 4:
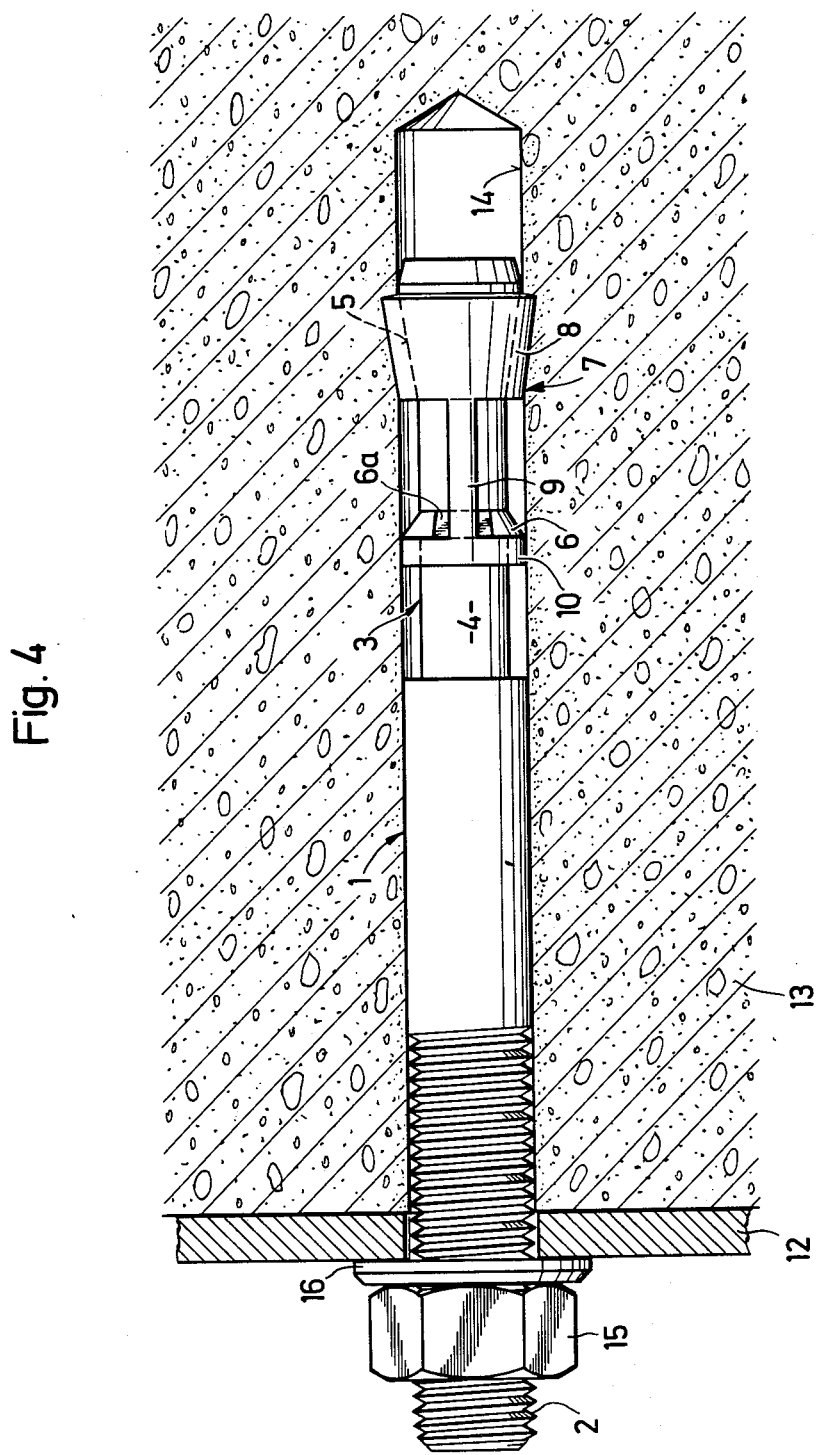
FIG. 4 is a view of the anchor bolt assembly, similar to that shown in FIG. 1, with the assembly secured within the borehole in a support structure.

In FIG. 1 an anchor bolt assembly is shown consisting of an axially elongated anchor bolt 1 and an expanding member 7. As can be seen in FIG. 4 the anchor bolt has a forward end which is inserted first into the borehole 14 in the support material 13 and a rearward end which, as illustrated, extends out of the borehole. As can be appreciated, however, the rearward or trailing end of the anchor bolt does not have to extend outwardly from the support material. Extending from its rearward end, the anchor bolt has an axially extending threaded section 2 and between the threaded section and the forward end of the anchor bolt there is an axially extending section 3 of reduced diameter as compared to the rearward end portion of the bolt. The reduced diameter section 3 consists of a cylindrical section 4, coaxial with the rearward section and a frusto-conical expanding section 5 extending forwardly from the cylindrical section 4 toward the forward end of the anchor bolt. The frusto-conical expanding section 5 diverges from the forward end of the cylindrical section 4 toward the forward end of the bolt. Intermediate the ends of the reduced diameter cylindrical section 4 is a stop in the form of an annular projection 6 extending outwardly from the cylindrical section. As can be seen more clearly in FIG. 2, the projection 6 has a pair of oppositely arranged circular sections joined at their opposite ends by chordally arranged flat sections 6a. The circular sections, as can be seen in FIG. 1, taper outwardly in the direction from the forward end toward the rearward end of the anchor bolt. The maximum diameter of the circular sections on the circumferential periphery of the projection 6 is approximately equal to the cylindrical section forming the rearward end of the bolt from the rearward end of the smaller diameter cylindrical section 4.

Figure 3:
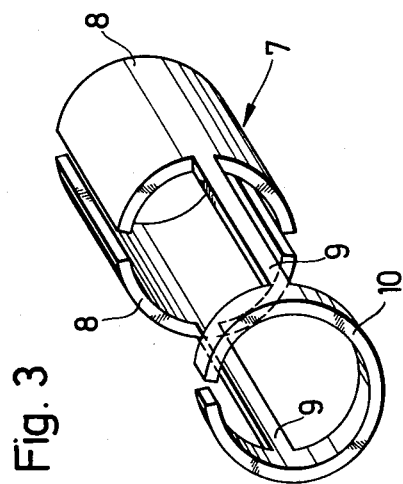
FIG. 3 is an enlarged perspective view of the expanding member of the anchor bolt assembly.
Figure 2:
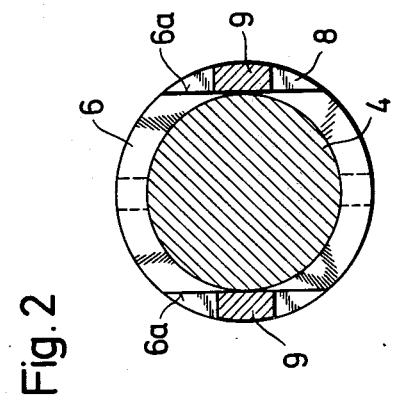
FIG. 2 is an enlarged cross-sectional view taken along the line II—II in FIG. 1.

As can be seen in FIG. 1, the expanding member 7 is positioned on the reduced diameter portion 3 of the anchor bolt extending from the rearward end of cylindrical section 4 to the rearward end of the expanding section 5. From the perspective view in FIG. 3 it can be seen more clearly that the expanding member 7 consists of two expanding shells 8 which are spaced apart along their axially extending edges and combine to form a tubular shaped section. A connecting member 9 extends from each of the expanding shells 8 in the axial direction of the bolt and is connected at its opposite end to a ring-shaped retaining member 10 which has a split-ring configuration. As can be seen in FIG. 2 the connecting members 9 are guided by the flat sides 6a of the annular projection 6 affording protection against the rotation of the expanding member 7.

In FIG. 4 the anchor bolt 1 of the assembly secures a part 12 to the surface of the support material 13. Initially, the anchor bolt assembly is inserted into the borehole 14 in the form shown in FIG. 1 and then by means of a nut 15 engaged on the threaded section 2 of the bolt, the bolt is pulled outwardly from the hole causing it to move relative to the expanding member 7. As the bolt moves outwardly, that is in the direction from its forward end toward its rearward end, its expanding section 5 telescopes into the tubular shaped portion of the expanding member 7 formed by the expanding shells 8 so that the shells move into anchoring engagement with the surface of the borehole 14. As displayed in FIG. 4, the maximum expanding distance has been utilized, that is the reduced diameter section 3 of the anchor bolt has moved relative to the expanding member 7 to the extent that the retaining member 10 has moved into contact with the face of the projection 6 directed toward the rearward end of the bolt. As the expanding section 5 moves into the expanding shells 8, the shells move radially outwardly and provide the desired anchoring action. With the stop or annular projection 6 contacting the forwardly facing end of the retaining member 10 any further displacement of the anchor bolt relative to the expanding member 7 is prevented and it is not possible for the expanding section 5 to move completely through the expanding shells 8 of the expanding member so that the anchoring action would be lost. As shown in FIG. 4, a washer 16 is positioned about the anchor bolt between the part 12 and the nut 15.

From FIG. 4 it can be seen that the rearward end of the anchor bolt which includes the threaded section 2 fits closely within the borehole 14 and the anchor bolt assembly can be inserted into the borehole without any interference, since the outside diameter of the expanding member 7 is about the same dimension as the rearward part of the anchor bolt.

While specific embodiments of the invention have been shown and described in detail to illustrate the application of the inventive principles, it will be understood that the invention may be embodied otherwise without departing from such principles.

What is claimed is:

1. An anchor bolt assembly for insertion into a borehole formed in a support structure such as for use in securing a part to the support structure, comprising an axially elongated anchor bolt and an expanding member mounted on said anchor bolt, said anchor bolt having a forward end to be inserted first into the borehole and a rearward end, said anchor bolt having a first axially extending section extending from the rearward end toward and spaced from the forward end thereof, a second axially extending section located intermediate the forward end of said anchor bolt and the end of said first section closer to the forward end of said anchor bolt, said second section having a smaller diameter than said first section, an axially extending expanding section located between the forward end of said anchor bolt and the end of said second section closer to the forward end of said anchor bolt, said expanding member having a tubular shaped section laterally enclosing at least an axially extending portion of said second section and located between said first section and said expanding section, said expanding section having side surfaces arranged to displace the tubular shaped section of said expanding member radially outwardly, means associated with said first section for displacing said anchor bolt in the axial direction extending from the forward end toward the rearward end of said anchor bolt for displacing said expanding section into said expanding member for expanding said tubular shaped section thereof radially outwardly into anchoring contact with the surfaces of the borehole, wherein the improvement comprises a stop means mounted on said second section for engaging said expanding member as said anchor bolt is displaced axially through said tubular shaped section thereof for preventing said expanding section from passing completely through said tubular shaped section whereby the anchoring effect would be lost, said first section is cylindrically shaped, said second section is cylindrically shaped and is coaxial with and extends from said first section, and said expanding section extending axially from the end of said second section remote from said first section, said expanding section being frusto-conically shaped with the smaller diameter end thereof located at the junction with said second section, said expanding member comprises a pair of oppositely arranged shell sections forming said tubular section, said expanding member includes a ring shaped retaining member spaced axially from said shell sections in a direction toward the rearward end of said anchor bolt, and axially extending connecting members connected to and extending between said shell sections and said retaining member.

2. An anchor bolt assembly, as set forth in claim 1, wherein said connecting members comprises a pair of members each extending between said retaining member and a different one of said shell sections and said connecting members having a dimension in the circumferential direction of said second section of said anchor bolt which is a fraction of the circumferential dimension of said shell sections.

3. An anchor bolt assembly, as set forth in claim 1, wherein said stop means being located on said second section of said anchor bolt and disposed in spaced relation to said first section and said expanding section, said stop means located between said shell section and said retaining member in the range of said connecting members when the expanding section of said anchor bolt is ready to be displaced through the tubular shaped section of said expanding member.

4. An anchor bolt assembly, as set forth in claim 3, wherein said stop means comprises an annular shaped outwardly extending projection formed on and extending circumferentially about said second section and extending outwardly therefrom.

5. An anchor bolt assembly, as set forth in claim 4, wherein said annular shaped projection having an outer circumferential periphery comprising a pair of diametrically opposed circular shaped sections with the ends of said circular sections being joined by rectilinear chord-like sections and said connecting members disposed in contact engagement with said rectilinear chord-like sections and disposed in angularly spaced relation to said circular shaped sections.

6. An anchor bolt assembly, as set forth in claim 1, wherein said means for displacing said anchor bolt comprises that said first section thereof extending from the rearward end thereof being threaded and a nut engageable with said threaded section.

7. An anchor bolt assembly, as set forth in claim 5, wherein said annular shaped projection having axially extending tapering side surfaces on said circular shaped sections with the side surfaces tapering outwardly toward the rearward end of said anchor bolt.

8. An anchor bolt assembly, as set forth in claim 5, wherein the end surface of said projection extending transversely of the axial direction of said anchor bolt and located closer to the rearward end of said anchor bolt forms a shoulder extending radially outwardly from said second section of said anchor bolt and being arranged to contact the end surface of said retaining member extending transversely of the axial direction of said anchor bolt and facing toward the forward end of said anchor bolt.

9. An anchor bolt assembly, as set forth in claim 1, wherein said first section of said anchor bolt having a diameter approximately equal to the maximum diameter of the expanding section of said anchor bolt.

10. An anchor bolt assembly, as set forth in claim 1, wherein the outside diameter of said tubular shaped section formed by said shell sections and said retaining member of said expanding member having a diameter approximately equal to the diameter of said first section of said anchor bolt.

11. An anchor bolt assembly, as set forth in claim 1, wherein the space between the end of said shell sections closer to said retaining member and said retaining member is such that the end surface of said retaining member facing toward the forward end of said anchor bolt contacts said stop means before said shell sections pass completely over said expanding section on said anchor bolt.

* * * * *